UNITED STATES PATENT OFFICE.

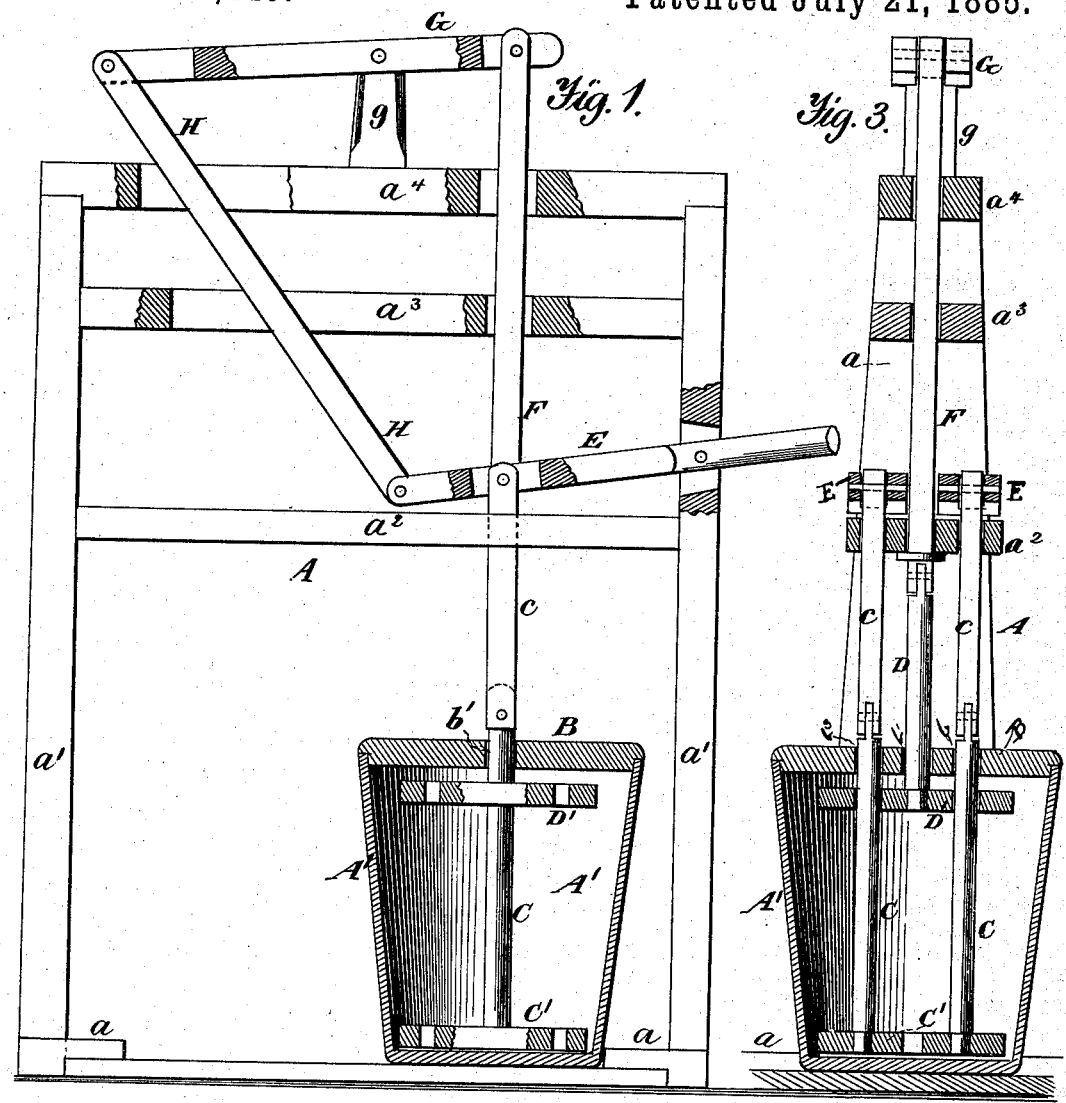

CALVIN HANNA, OF HARDIN COUNTY, TENNESSEE.

CHURN.

SPECIFICATION forming part of Letters Patent No. 322,445, dated July 21, 1885,

Application filed April 28, 1885. (No model.)

*To all whom it may concern:*

Be it known that I, CALVIN HANNA, of the county of Hardin and State of Tennessee, have invented an Improved Churn, of which the following is a specification.

The special object of the invention is to make a churn that will not only do its work well, but in the least possible time and with a minimum of labor.

Figure 1 of the drawings is a side elevation, partly in section; Fig. 2, a plan view, and Fig. 3 a vertical cross-section.

In the drawings, A represents the frame, which has the bases $a\ a$, which may be connected by a flooring, if desired. From the base-pieces $a\ a$ rise the uprights $a'\ a'$, connected by the slotted cross-pieces $a^2\ a^3\ a^4$.

A' is a preferably cylindrical cream-receptacle having a rabbeted cover and any suitable provisions for preventing the egress of the cream during the operation of churning.

The cover B is provided with three holes, $b\ b'\ b^2$, through which pass the perpendicular stems C D C. To the lower end of stems C C is attached, on opposite sides, the bottom dasher, C', and to the lower end of the median stem, D, is centrally attached an upper dasher, D'. Each of these dashers is perforated in any well-known way.

To the upper ends of the stems C C are attached rods $c\ c$, pivoted both to said stems and to the common lever E, which is fulcrumed on the upright $a'$, passes therethrough, and is brought within easy reach of the operator.

To the stem D is pivoted the end of a long rod, F, which passes up through cross-pieces $a^2\ a^3\ a^4$ and through a median hole at the front end of lever E to a lever, G, fulcrumed on a stud, $g$. The power end of lever G is connected by a pivoted rod, H, with the front end of lever E, passing through slots of the two highest cross-pieces $a'\ a'$.

The operation is as follows: The operator works the lever E, like the handle of a pump, by an oscillating movement, which causes the two dashers C' D' to move alternately to and from each other, thus compressing the cream between them on one stroke and on the other pressing it against the top and bottom.

By this mode of operation no time or labor is wasted on a return-stroke. It will also be noticed that the dashers move perpendicularly and in the same vertical plane, thus minimizing friction and waste of power. It will also be observed that the levers E G are reversed in position, so as to bring their front ends so that one will be over the other and their draft-rods $c\ c$ F in the same plane. Thus the movements are most nearly brought in a right line, the arc of the curve made by the ends of the rods being very small.

Having thus described all that is necessary to a full understanding of my invention, what I claim, and desire to protect by Letters Patent, is—

In a churning apparatus, the combination, with three dasher stem rods, of the two levers E G, connected at their ends by a diagonal pivoted rod, the lower lever connected at its front with the two outside rods and the higher lever with the middle rod, as and for the purpose described.

CALVIN HANNA.

Witnesses:
   J. A. HANNA.
   M. WHITE.